March 27, 1962  J. S. WHEELER, JR  3,026,901
VALVE

Filed Oct. 10, 1957  3 Sheets-Sheet 1

Joseph S. Wheeler, Jr.
INVENTOR.

BY Murray Robinson
ATTORNEY

March 27, 1962 J. S. WHEELER, JR 3,026,901
VALVE
Filed Oct. 10, 1957 3 Sheets-Sheet 2

Joseph S. Wheeler, Jr.
INVENTOR.

BY Murray Robinson
ATTORNEY

March 27, 1962 J. S. WHEELER, JR 3,026,901
VALVE

Filed Oct. 10, 1957 3 Sheets-Sheet 3

Joseph S. Wheeler, Jr.
INVENTOR.

BY Murray Robinson
ATTORNEY

United States Patent Office 3,026,901
Patented Mar. 27, 1962

3,026,901
VALVE
Joseph S. Wheeler, Jr., Houston, Tex., assignor to Wheeler Valve and Pump Company, a corporation of Texas
Filed Oct. 10, 1957, Ser. No. 689,304
1 Claim. (Cl. 137—454.2)

This invention pertains to valves and more particularly to check valves for fluid transmission pipelines.

With increasing diameters and pressures of pipelines there has been an attendant increase in cost and weight of check valves used therein. There also results an increase in the expense of handling, installing and servicing such large valves.

It is the principal object of the invention to provide an inexpensive, lightweight check valve which can be easily and inexpensively handled, installed, and serviced.

According to the invention a valve body is provided having the general shape of a coupling flange which can be clamped between the coupling flanges on the adjacent ends of the pipeline. The valve closure means takes the form of two half discs disposed with their straight sides adjacent and loosely pivotally mounted on a shaft extending diametrically across the valve body into sockets on the inside of the valve body. The valve seats comprise an annular shoulder extending around the inner periphery of the valve body and the coplanar surface of a diametral rib formed or cast integral with the valve body and extending across the valve body in azimuthal alignment with the shaft.

By virtue of the free floating or loosely pivoted mounting of the valve closure members there is assured a seal with the valve seats. The diametral rib provides not only seats which seal with the straight sides of the closure members but also an additional support for the closure members. As a result the closure members need not be nearly as thick in order to resist any given pressure. The specific shape and mounting of the closure members allows them to open like a hinge and fold back flat against each other leaving a maximum clear flow passage without the necessity for providing any additional body cavity space of much larger internal diameter than the pipeline with which the valve is connected. The valve seat is between the ends or opposite faces of the body and is spaced sufficiently from the downstream end or face of the body so that when the valve is closed the entire unit can be withdrawn from the pipeline without removing the adjacent sections of pipe from the line.

Other objects and advantages of the invention will appear from the following description of preferred embodiments thereof wherein.

Figure 1:
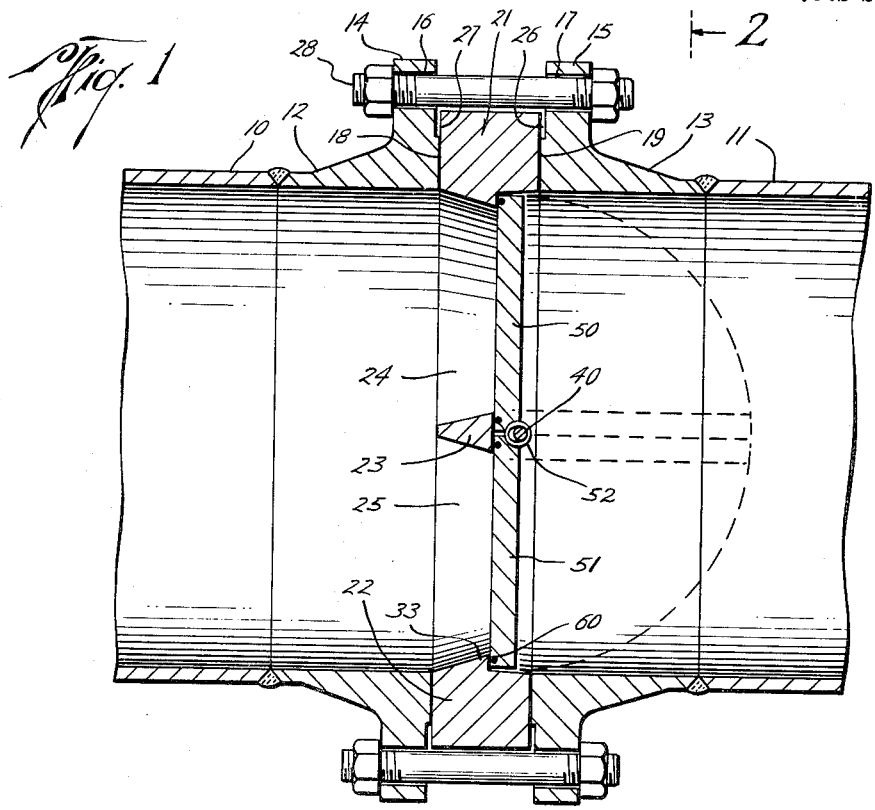
FIGURE 1 is an axial section through a portion of a pipeline including a valve embodying the invention.

Referring now to FIGURE 1 there is shown a portion of a pipeline including pipes 10, 11 to which couplings 12, 13 are welded. The couplings have the same inner diameter as the pipes. The couplings are provided with flanges 14, 15 each having a plurality of azimuthally spaced apart bolt holes 16, 17 therethrough. The flange ends of the couplings are provided with seating surfaces 18, 19, the outer portions of the ends of the couplings being relieved below the seating surfaces where the bolt holes are located.

Figure 3:
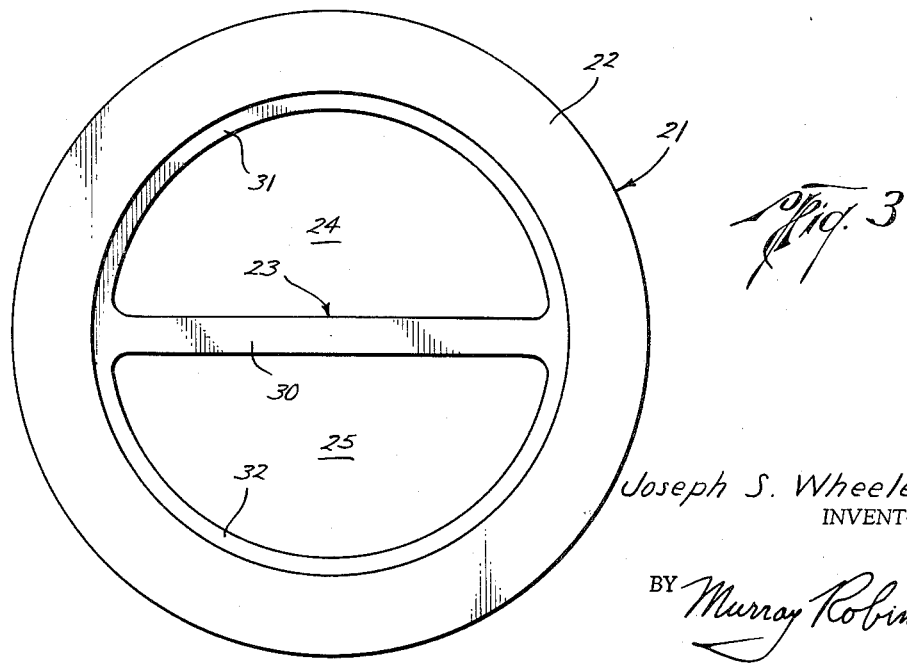
FIGURE 3 is a view similar to FIGURE 2 showing the valve body alone.

Between the flanges of the couplings is disposed valve body 21. The valve body has the shape of a divided ring, that is, as shown also in FIGURE 3, it includes a circular or ring shaped portion 22 and a diametral rib 23 dividing the space inside the ring into two separate passages 24, 25, each of semi-circular cross-section. The end faces 26, 27 of the ring portion of the valve body provide seating surfaces to engage and seal with seating surfaces 18, 19 of the coupling flanges when bolts 28 are tightened.

The rib 23 has a plane surface 30 disposes between the end faces of the valve ring. The adjacent parallel longitudinal sides of surface 30 provide straight valve seating surfaces which merge with semi-circular seating surfaces 31, 32 formed on annular shoulder 33 on the inner periphery of the valve ring. There is thus provided a continuous valve seat around each of the passages 24, 25.

Figure 2:
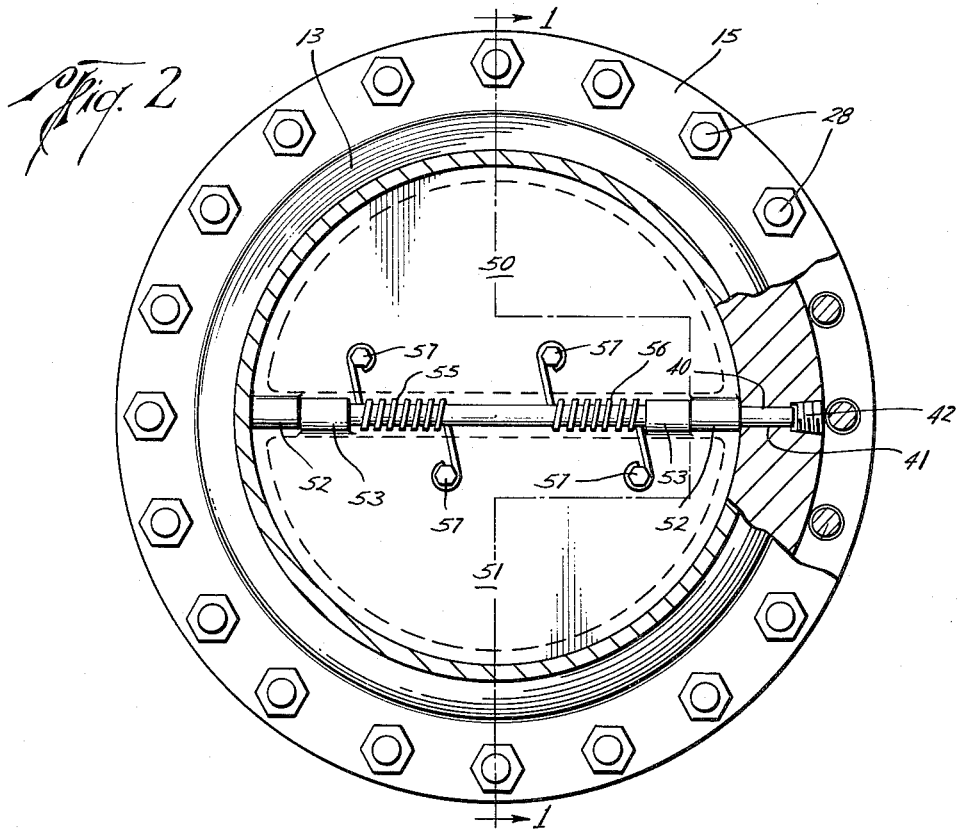
FIGURE 2 is an end view of the valve, partly in section.

A shaft 40, best shown in FIGURE 2, extends diametrically across the valve ring parallel to rib 23 and spaced therefrom. The ends of the shaft are received in holes such as 41 in the valve ring. The outer ends of the holes are counterbored and tapered threaded to receive screw plugs 42 to close and seal same.

A pair of semi-circular disc shaped valve closures 50, 51, are each provided with a pair of bearings 52, 53 disposed on shaft 40. As shown in FIGURE 1, the bearings are of larger inner diameter in the direction perpendicular to the discs than the outer diameter of the shaft so as to make a loose fit. By this means the closures are pivotally mounted for floating movement between a closed position in which they lie against the valve seats around passages 24, 25 as shown in full lines in FIGURE 1 and open positions at angles thereto as shown in dashed lines. If desired a stop may be provided on one or both closures to prevent them from coming into full engagement with each other when fully open so as to insure that they will close upon reversal of line pressure. Normal flow direction is from pipe 10 toward pipe 11. However it is preferred to bias the closures to closed position by means of a pair of helical torsion springs 55, 56 disposed around shaft 40 and secured at their opposite ends to the closures by screws 57. The heads of the screws will incidentally serve as stops to prevent the closures from coming into full engagement with each other. The spring coils have a larger inner diameter than the outer diameter of the shaft 40 so as to maintain the floating relationship between the shaft and the closures. This insures proper seating of the closures on their seats by allowing them to move until coplanar with the seats.

Around the edge of each valve closure where the closure engages its seat is disposed a channel such as 60 having a trapezoidal cross section in which is disposed a synthetic rubber packing material bonded in place. The retrograde inclination of the channel walls serves to provide additional retention for the packing material. The packing will protrude slightly out of the channel when the valve is open but does not quite fill the channel at the edges so when the valve is closed there is space for the packing to flow into and the valve closures can move into full metal to metal contact both inside and outside the packing.

Figure 4:
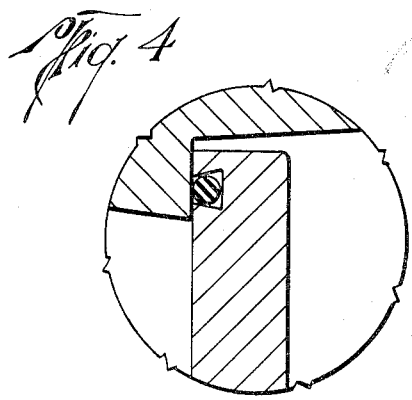
FIGURES 4 and 5 are axial sections through a portion of a closure and seat of the valve showing alternative forms of sealing arrangements.
Figure 5:
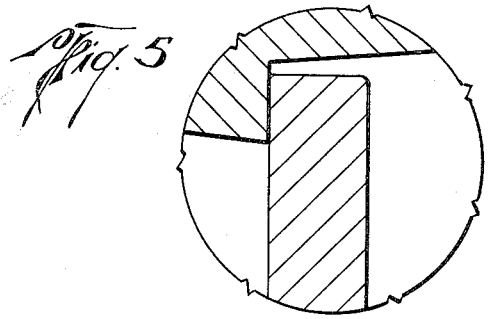

Alternative packing means can be used, for example an O-ring as shown in FIGURE 4, or a plain metal to metal seal as shown in FIGURE 5.

As shown in FIGURE 1, when the valve is closed all portions of the valve lie within a volume bounded by the periphery and end faces of the valve body ring so that the valve can be installed and removed by sliding it laterally between the couplings 12, 13 when sufficient of the bolts have been removed. The body is held in register with the couplings by the bolts when the valve is in use. Instead of a smooth cylindrical periphery as shown, the valve body ring might be scalloped so as to protrude between the bolts, e.g. to the same diameter as the couplings. If desired the body ring could have a smooth cylindrical periphery of the same diameter as the couplings and be provided with similar bolt holes. The shape shown is preferred because of its light weight and ease of assembly and disassembly, no azimuthal registry of holes being required in assembly and fewer bolts having to be removed in order to allow removal of the valve from the pipeline.

It would also be possible to provide packing rings or gaskets between the end faces of the couplings and the ends of the valve body ring but this would complicate assembly and disassembly so that the plain metal to metal contact shown is preferred.

It will be noted from FIGURE 1 that the valve closures have a slightly smaller radius than the pipeline and couplings. This is to insure clearance in case the valve body ring is not in perfect registry with the couplings, as is possible due to the usual clearances provided in the coupling bolt holes. The shoulder 33 projects far enough inwardly to provide sufficient overlap between closures and seats. The shoulder 33 is of triangular cross-section which, together with the triangular section of rib 23, provide a streamlined wall for flow passages 24, 25 with respect to the normal direction of flow. However, there is nevertheless a slight reduction in cross-sectional area available for fluid flow through the valve. If a full cross-section is desired the modified construction shown in FIGURE 6 may be employed.

Figure 6:
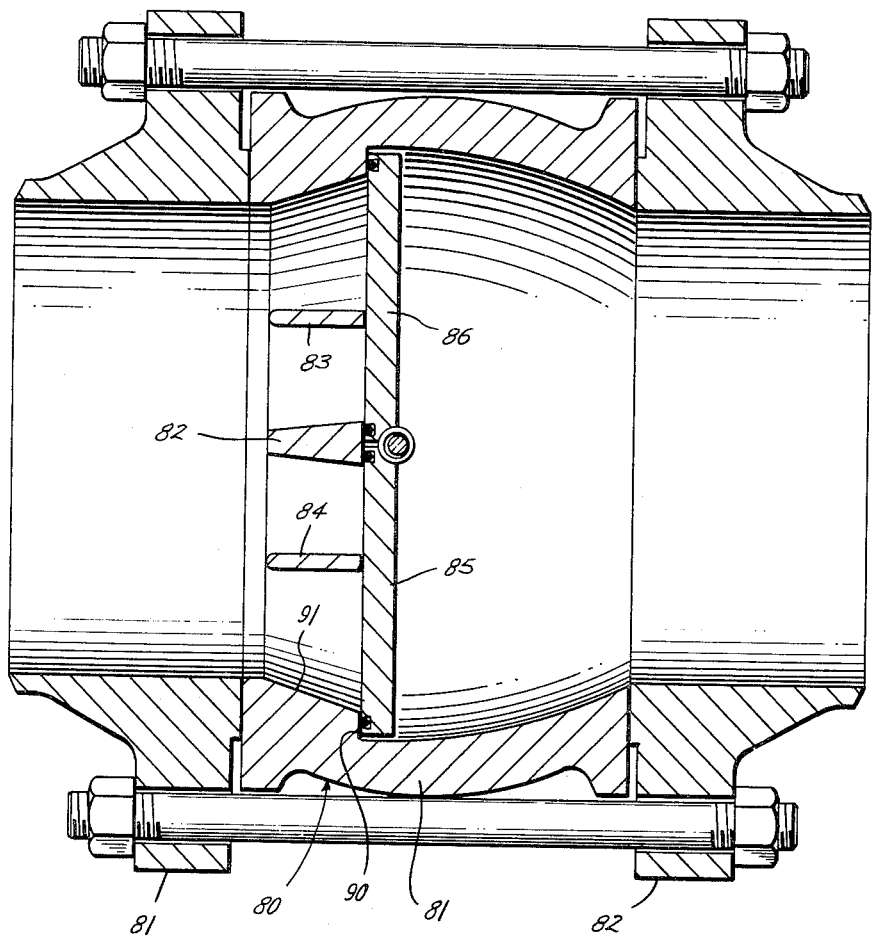
FIGURES 6 is a view similar to FIGURE 1 showing a modified form of the valve.

Referring to FIGURE 6, there is shown a valve having a body 80 disposed between two pipeline couplings 81, 82 in the same way as the valve of FIGURE 1 is assembled in the pipeline there shown. Valve body 80 includes a ring portion 81, a diametral rib 82, and a plurality of chordlike ribs 83, 84. The ends of the valve body ring have the same inner diameter as the couplings but the interior of the ring tapers to a larger inner diameter so as to accommodate larger valve closures 85, 86. Closures 85, 86 seat and seal against seats provided by rib 82 and annular shoulder 90, and are additionally supported by ribs 83, 84. Preferably the entire valve body, including ring 81, and ribs 82, 83, 84 is cast integral.

Valve body 80 is longer than that shown in FIGURE 1, in relation to the pipe diameter, so that the valve closures 85, 86 do not extend outside the valve body until they have pivoted about half way toward the full open position. During their initial opening movement the closures travel through the globular slightly enlarged body cavity inside the valve body ring. By the time they extend outside the ring, the closures have come together to such an extent that they clear the inside of the couplings.

The valve body shape shown in FIGURE 6 allows the cross sectional area of the flow passages bounded by the valve seats to be as large or larger than the area of the couplings and other parts of the pipeline. The tapering entrance throat 91 enlarges in cross section rapidly so that the area reduction due to the presence of the ribs 82, 83, 84 is compensated. There results substantially no flow constriction at the valve.

The bearings for the valve closures 85, 86 make a loose fit with their supporting shaft, but instead of being elongated only in the direction perpendicular to the closures as in FIGURE 1, they may be of circular cross-section, as shown in FIGURE 6. In the FIGURE 1 embodiment it is particularly desirable to have the bearings elongated only in the direction perpendicular to the closure so as to fully constrain the closures with respect to motion parallel to the plane of the closures, due to the limited space available at the peripheries of the closures inside the valve body. In the FIGURE 6 embodiment however, where the body is larger, it is not essential to fully constrain the closure with respect to motion parallel to the planes of the closures and the less expensive circular cross-section bearings shown can be used, if desired. It is obvious that the bearing shape of FIGURE 1 could be used in the FIGURE 6 embodiment if desired.

Except as noted the FIGURE 6 valve construction is the same as that of FIGURE 1. The full flow features of the FIGURE 6 construction can be used without the presence of the supplemental supporting ribs 83, 84, the latter being useful primarily in connection with high pressure valves, although with a full flow valve there is inherently a larger closure area to be supported. The valve shown in FIGURE 1 is approximately quarter scale and is designed for service handling pressures up to 160 p.s.i. By adding integral supplemental ribs it can readily be adapted for 600 p.s.i. without increasing the closure thickness.

While preferred embodiments of the invention have been shown and described, many modifications thereof can be made by one skilled in the art without departing from the spirit of the invention and it is desired to protect by Letters Patent all forms of the invention falling within the scope of the following claim:

Apparatus adapted for use in a pressure fluid pipeline intermediate the ends of the pipeline, including a pair of flanged pipe couplings, a check valve comprising a divided ring body providing a plurality of flow passages therethrough, said body including a ring having a seating face on each end thereof parallel to the adjacent flange face of said couplings, said body clamped between adjacent faces of said coupling flanges, said valve body including a rib extending diametrically thereacross dividing the body into two sections, there being at least one flow passageway between one side of said rib and one-half of said ring and at least another flow passageway between the other side of said rib and the other half of said ring, a continuous valve seat extending around the inner periphery of said one-half of the ring and the adjacent portion of said rib, a continuous valve seat extending around the inner periphery of the other half of said ring and the adjacent portion of said rib, said valve seats being disposed between the ends of the ring and both facing the same one of the ends and spaced therefrom, a pair of valve closures, each closure having the shape of a half disc, at least one supporting member at each side of the diametral rib in position to engage the adjacent valve closure when the valve is closed, said supporting members extending across said ring as chords, said supporting members and said rib being cast integral with the valve body ring, a common shaft extending diametrically across said valve body ring parallel to said rib, bearing means on each closure mounting each closure for pivotal motion on said shaft about the diametral side of the semi-disc between a closed position in which the closure engages said seats and an open position in which the closure is out of full engagement with its seat, said bearings having bores larger in diameter than said shaft providing for limited translation of each closure relative to its seat when in closed position, whereby pipeline pressure acting on the closures moves each closure to fully closed position, bearing sockets formed by holes through the valve body ring, said shaft having its ends supported in said sockets, removable screw plugs closing the outer ends of said holes, a continuous groove in each valve closure adjacent its periphery, and seal means in said grooves engaging the valve seats when the closures are seated and sealing between the seats and closures, the spacing of said seats from said one of the ends of the valve body ring being at least as great as the thickness of said half disc whereby when the valve is closed the valve can be removed from the pipeline by motion transverse to the pipeline between said coupling flanges.

(References on following page)

References Cited in the file of this patent

UNITED STATES PATENTS

| | | | |
|---|---|---|---|
| 87,728 | Taws | Mar. 9, | 1869 |
| 345,420 | Eskholme | July 13, | 1886 |
| 486,600 | McGowan | Nov. 22, | 1892 |
| 1,238,878 | Bravo | Sept. 4, | 1917 |
| 1,438,161 | Zimmerman | Dec. 5, | 1922 |
| 1,603,123 | Kuehne | Oct. 12, | 1926 |
| 1,673,831 | Kuehne | June 19, | 1928 |
| 1,777,580 | Russell | Oct. 7, | 1930 |
| 2,105,282 | Dolby | Jan. 11, | 1938 |
| 2,170,478 | Long et al. | Aug. 22, | 1939 |
| 2,195,292 | Albertson | Mar. 26, | 1940 |
| 2,277,295 | Brown | Mar. 24, | 1942 |
| 2,358,101 | Randall | Sept. 12, | 1944 |
| 2,482,198 | Melichar | Sept. 20, | 1949 |
| 2,556,904 | Cline et al. | June 12, | 1951 |
| 2,599,898 | Dalrymple | June 10, | 1952 |
| 2,729,238 | Hite | Jan. 3, | 1956 |
| 2,737,375 | Kittler | Mar. 6, | 1956 |
| 2,831,499 | Myron | Apr. 22, | 1958 |
| 2,886,062 | Wheatley | May 12, | 1959 |
| 2,930,400 | Wheatley | Mar. 29, | 1960 |

FOREIGN PATENTS

| | | | |
|---|---|---|---|
| 295,710 | Switzerland | Mar. 16, | 1954 |

UNITED STATES PATENT OFFICE
CERTIFICATE OF CORRECTION

Patent No. 3,026,901                      March 27, 1962

Joseph S. Wheeler, Jr.

It is hereby certified that error appears in the above numbered patent requiring correction and that the said Letters Patent should read as corrected below.

In the grant, lines 2 and 12, and in the heading to the printed specification, lines 3 and 4, name of assignee, for "Wheeler Valve and Pump Company", each occurrence, read -- Mission Valve and Pump Company --.

Signed and sealed this 28th day of August 1962.

(SEAL)
Attest:

ESTON G. JOHNSON                                DAVID L. LADD

Attesting Officer                                    Commissioner of Patents